Figure 1:
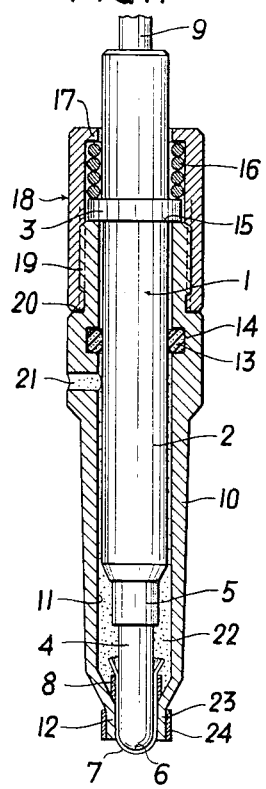

United States Patent

[11] 3,629,936

| | | | |
|---|---|---|---|
| [72] | Inventor | Karl Harnoncourt | |
| | | Graz, Austria | |
| [21] | Appl. No. | 887,073 | |
| [22] | Filed | Dec. 22, 1969 | |
| [45] | Patented | Dec. 28, 1971 | |
| [73] | Assignee | Hans List | |
| | | Graz, Austria | |
| [32] | Priorities | Dec. 23, 1968 | |
| [33] | | Austria | |
| [31] | | A 12554/68; | |
| | | Dec. 4, 1969, Austria, No. A 11343/69 | |

[54] ELECTRODE ARRANGEMENT FOR THE MEASUREMENT OF PARTIAL PRESSURES OF GASES IN LIQUIDS AND METHOD OF ITS MANUFACTURE
6 Claims, 11 Drawing Figs.

[52] U.S. Cl. .................................................... 29/592
[51] Int. Cl. ...................................................... H01s 4/00
[50] Field of Search ........................................ 204/195 P, 195 M, 1 T; 29/569, 570, 592

[56]            References Cited
          UNITED STATES PATENTS
2,967,960    1/1961    Waldschmidt ................ 29/592

Primary Examiner—John F. Campbell
Assistant Examiner—Richard Bernard Lazarus
Attorney—Watson, Cole, Grindle & Watson ABSTRACT: An electrode arrangement of a design for serial production and measuring the properties of individual electrodes. The measuring is carried out in a carrier of a housing with the extremity of the electrodes being sealed off in a sealing means and an electrolytic liquid being provided in a zone between two sealing means.

PATENTED DEC 28 1971  3,629,936

SHEET 1 OF 3

Inventor
Karl Harnoncourt
By Watson, Cole, Grindle & Watson
Attys.

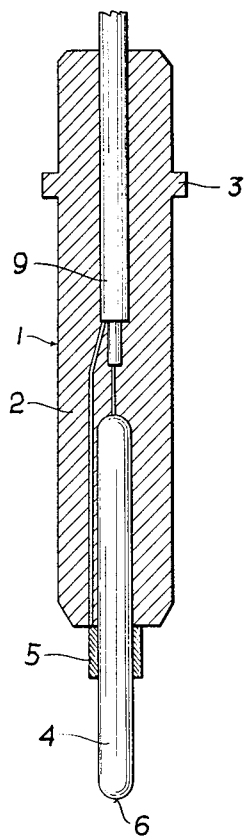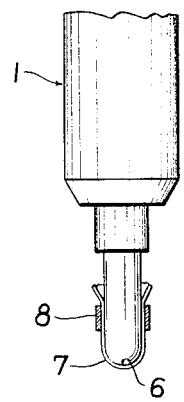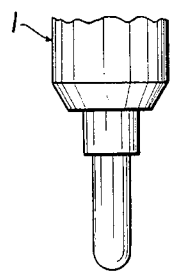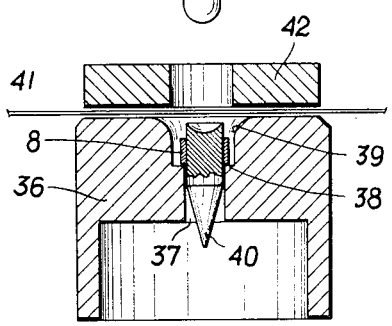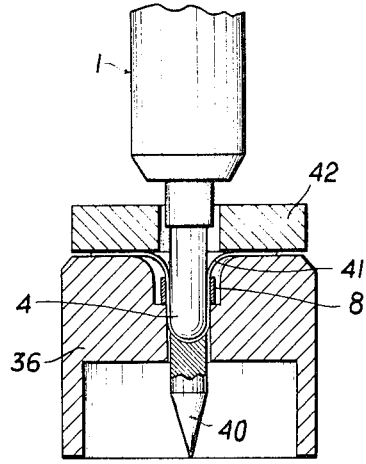

PATENTED DEC 28 1971

3,629,936

SHEET 3 OF 3

Inventor
Karl Harnoncourt
By
Watson, Cole, Grindle & Watson
Attys.

ELECTRODE ARRANGEMENT FOR THE MEASUREMENT OF PARTIAL PRESSURES OF GASES IN LIQUIDS AND METHOD OF ITS MANUFACTURE

The invention relates to an electrode arrangement for the measurement of partial pressures of gases in liquids, particularly for the measurement of the partial pressures of carbon dioxide and/or oxygen in connection with the analysis of the blood gases, comprising an electrode, the sensitive extremity of which is covered by a liquid proof membrane which is, however, permeable to gases and a reference electrode arranged in spaced relation to the said sensitive extremity and electroconductively connected with the sensitive extremity of the electrode by means of an electrolytic layer.

Examples of this type of electrodes are the electrode after Severinghaus generally used in connection with the analysis of blood gases for the measurement of the partial pressure of carbon dioxide or the electrode after Clark for the measurement of the partial pressure of oxygen. However, the trouble with these known electrodes are the considerable difficulties encountered in the production of an extremely thin electrolytic layer to provide an electrically conductive connection between the sensitive surface of the electrode and the reference electrode. According to a known method, the sensitive extremity of similar electrodes used to be manually coated with an intermediate layer serving as an electrolyte carrier and then covered with the membrane. During the assembly of the measuring apparatus, these electrodes are usually pressed with their coated portion against a sealing surface in such a manner that the sensitive extremity protrudes into the measuring chamber.

Experience goes to show that in conventional electrode arrangements usually tedious tuning operations by highly skilled operators are required to obtain consistency of measuring values over any length of time and/or interchangeability of electrodes. Unless extreme care is sued in the performance of these operations, the inaccuracy of measurements will be such as to render the practical usefulness of this analysis method highly problematic.

One of the main difficulties inherent in conventional electrode arrangements is due to the necessity of uniformly applying the membrane to the intermediate layer serving as an electrolyte carrier. Such uniform application is indispensable if identical measuring results are to be expected for a plurality of electrodes so as to assure interchangeability of these electrodes.

Another drawback of conventional electrode arrangements resides in the fact that as a result of the application of the membrane to a sealing surface during the installation of the electrodes in the measuring apparatus, the additional pressure applied to the membrane is bound to produce an alteration of the thickness of the electrolytic layer. As a result, the measuring properties of the electrode will be altered during the assembly, calling for a renewal of tuning operations following each installation of electrodes or whenever the installation pressure is otherwise modified. Finally, the additional mechanical stress to which the membrane is thus subjected will result in a substantial shortening of its service life. Consequently, the electrodes will have to be recoated at comparatively brief intervals.

Besides, in conventional electrode arrangements insufficient tightness of the chamber containing the electrolytic liquid necessitates repeated electrolyte refills or renewals. In order to maintain the electrodes in serviceable condition, it is therefore, necessary to provide for permanent care and surveillance. Unless carefully attended to, the electrodes will become unserviceable due to desiccation.

It is the object of the invention to provide an electrode arrangement offering a uniformly high standard of measuring properties over a considerable period of time and of a design which is suitable for serial production. Likewise, the measuring properties of the individual electrodes should be identical among themselves to as to be interchangeable without any complicated tuning operations. Furthermore, the installation of the electrodes should be easy enough for even unskilled operators to be able to exchange the electrodes of necessary. Finally, the electrodes should be such as to preclude any damage to them or impairment of their measuring properties even in the event of frequent exchanges.

According to the invention this problem is solved by arranging an electrode carrier in the stepped axial bore of a housing closely encompassing the same, the sensitive extremity of the electrode being sealed off in the narrowed portion of the bore by a sealing means, whereas the shaft of the electrode carrier is sealed off by a sealing means in the enlarged portion of the bore, an electrolytic liquid being provided in the zone between the two sealing means. This design assures maximum protection from damage for the covered electrode both during its installation and in operation in conjunction with positive sealing against the outside of the chamber filled with electrolyte, the electrode carrier together with its housing forming a compact unit largely insensitive to external influences. At the same time, this protective arrangement of the sensitive extremity precludes any alteration of the measuring properties during the installation of the electrode unit in the measuring instrument.

Thus the electrodes can be exchanged in a simple manner with a minimum of tuning operations provided qualitatively uniform coverage of the electrodes is assured. Likewise, careful treatment of the electrode results in a considerably longer service life of same as compared with conventional types.

According to a preferred embodiment of the invention, the shaft of the electrode carrier comprises an annular flange, the inner annular surface of which adjoins the front face of the housing with a pressure spring engaging its outer annular surface, the other extremity of the said pressure spring resting on the bottom surface of a screwcap screwed on to the housing. As a result, the annular flange of the electrode carrier is always applied with the same force to the front face of the housing and the position of the electrode carrier in the housing is not altered even if the screwcap were tightened. Any alteration of sensitivity due to objectionable stresses on the reference electrodes is thus precluded.

Likewise, according to the invention the housing terminates on the side of the sensitive extremity of the electrode in a narrowed cylindrical extension carrying a gasket on its surface. Accordingly, the gasket provided on the housing extension is used instead of the membrane to provide a sealing against the receiving bore of the measuring instrument during the installation of the electrode, thereby protecting the membrane from additional loads.

Another method of producing the above-mentioned sealing effect according to the invention consists in having the housing terminate on the side of the sensitive extremity of the electrode in a tapered extension in such a manner that the sealing is effected on the conical surface of the extension which is to be accurately fit into the conical receiving bore of the measuring instrument.

In order to achieve the hermetic sealing of the electrode chamber in a particularly simple manner, the membrane can be extended, according to the invention, in the direction of the shaft of the electrode carrier and attached with its inner extremity to the electrode carrier and/or the surrounding housing in such a manner as to provide a hermetic sealing, and constitutes a bag containing the electrolytic liquid and extending from the sensitive extremity of the electrode as far as the point of attachment of the membrane of the electrode carrier or on the housing.

This design offers the advantage of ensuring an extremely safe and lasting electrolytic connection between the sensitive extremity of the electrode and the reference electrode while providing a simplified sealing means for the chamber containing the electrolyte. Consequently, practically no attendance is required for the electrode arrangement without thereby impairing the sensitivity of the measuring device.

According to the invention, a preferred feature of the aforementioned design of the electrode arrangement provides for an inner extremity of the membrane pulled over part of the shaft of the electrode carrier and attached thereto by means of a collar, binding twine or the like, surrounding the extremity of the membrane and preferably secured by means of a slid-on sleeve in such a manner as to afford effective sealing. With this construction, any insulation difficulties between the medium (blood) to be measured and the electrolytic liquid are avoided even in the event of a leakage between the electrode carrier with its membrane and the housing. With this design the installation of the covered electrode carrier in the housing is particularly simple and easy.

According to another embodiment of the invention, the inner extremity of the membrane of the electrode arrangement is pulled over a tubular extension of the housing and tightly secured thereto by gluing and/or by means of a sleeve surrounding the extremity of the membrane. This design feature distinguishes itself particularly by the way in which it simplifies assembling operations. In particular, the filling of the bag formed by the membrane with a predetermined amount of electrolytic liquid is thereby greatly facilitated and accelerated.

The invention furthermore relates to a method for the manufacture of an electrode arrangement wherein the liquid-proof membrane which is, however, permeable to gases is shrunk onto the sensitive extremity of the electrode, an electrolytic connection being established between the sensitive extremity and the reference electrode. It is the object of the method according to the invention to achieve uniform coverage of the cooling surface of the electrode and consequently, easy interchangeability of the electrodes without any major alteration of their sensitivity. For that purpose, according to the invention a foil constituting the membrane is applied to an underlayer provided with a depression, whereupon the electrode is impressed with its sensitive extremity into the said foil in the area of the depression of the underlayer in such a manner that the foil extends as a uniform coating over the extremity of the electrode, an elastic fastening ring being simultaneously pulled over the coated extremity of the electrode. Then the electrode carrier with the covered electrode is installed in the housing, sealed off against the housing at the sensitive extremity of the electrode and on the shaft, whereupon the interior of the housing is filled with electrolytic liquid between the two sealing areas. This method which is intended to meet the requirements of serial production particularly eliminates individual influences during the covering of the sensitive extremity of the electrode and the occurrence of additional assembling stresses during the final assembly of the electrode unit. In order to preclude occasional alterations of sensitivity due to temperature fluctuations it is advisable to close the filling hole of the electrode housing by means of an elastic sealing element after the electrolytic liquid has been introduced, the said sealing element permitting equalization of pressure of the electrolytic liquid.

According to a preferred embodiment of the invention, the foil constituting the membrane is loaded with a uniform surface pressure in the area around the depression of the underlayer by means of a weight, a spring-loaded clamping ring or the like.

For the manufacture of an electrode arrangement according to the invention comprising an electrolyte-filled bag formed by a membrane extended in the direction of the shaft of the electrode carrier, it is advisable to use a method according to which the membrane is clasped so as to form a bag, placed with its open end directly around the housing extension and tightly secured thereto, whereupon the electrolytic liquid is poured into the bag formed by the membrane and thereafter the electrode carrier is inserted in the housing from the side opposite the membrane in such a manner that the membrane encompasses the sensitive extremity of the electrode and finally the electrode carrier is tightly connected to the housing such as by gluing or the like.

This method has proved to be particularly advantageous for the serial production of similar electrode arrangements as it permits the serial filling of the onesidedly housing with the electrolytic liquid following the serial installation of the bag-shaped membrane in the electrode housing. The further operational steps of combining the electrode carrier with the housing and their tight interconnection are also readily included in a largely automatic assembling process.

Figure 2:
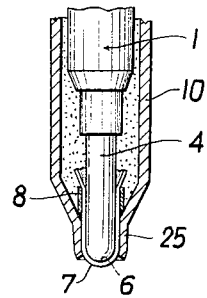
Figure 3:
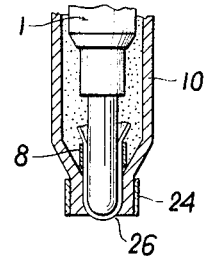
Figure 4:
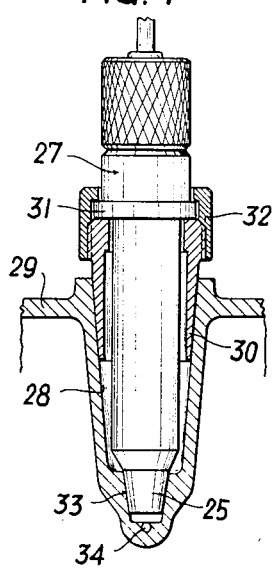
Figure 5:
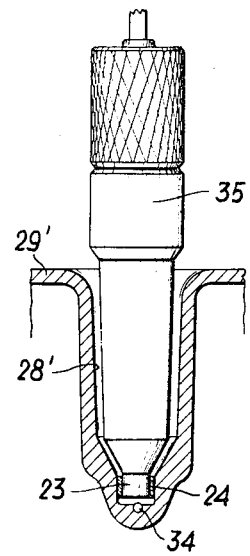

Further details of the invention will appear from the following description of several embodiments of the invention with reference to the accompanying drawing in which FIG. 1 shows an axial cross-sectional view of an electrode assembly according to the invention, FIGS. 2 and 3 each show a partially axial cross-sectional view of variants of the electrode arrangement according to the invention, FIGS. 4 and 5 each show axial cross-sectional views illustrating the installation of the electrode arrangement by way of example, FIG. 6 is an axial cross-sectional view of an uncovered electrode carrier, FIGS. 7 and 8 show two consecutive stages of the process according to the invention, and FIG. 9 is an axial cross-sectional view of an electrode covered by the method according to the invention.

Figure 10:
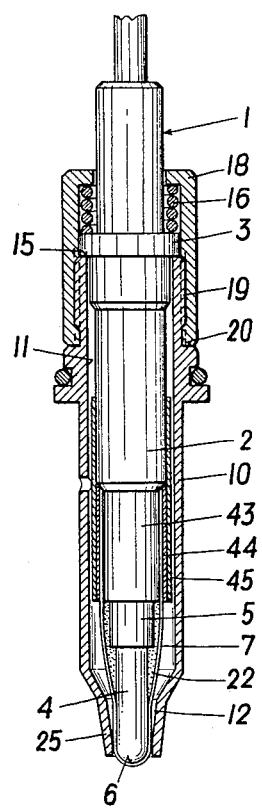
Figure 11:
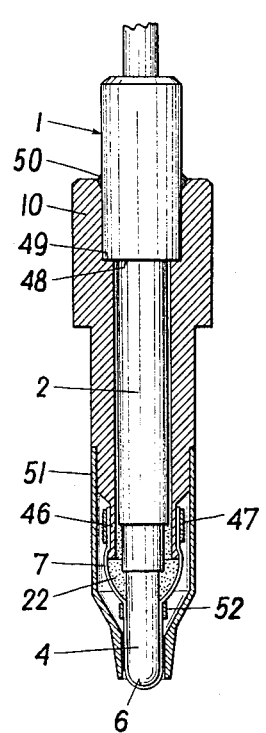

FIGS. 10 and 11 are axial cross-sectional views of two additional variants of the electrode assembly according to the invention.

The completely assembled electrode unit according to the invention as shown in FIG. 1 comprises an electrode carrier 1 having an essentially cylindrical shaft 2 with an annular flange 3 and carrying a rod-shaped electrode 4 over which a sleevelike reference electrode 5 is pulled, the sensitive surface 6 of the first-mentioned electrode being formed by its rounded-off outer extremity.

The electrode 4 is covered by a membrane 7 which is impermeable to liquids but permeable to gases and retained in position by means of a rubber gasket 8. From the opposite end of the electrode carrier 1 a connection cable 9 leads to an electrical measuring instrument (not shown).

The electrode carrier 1 is inserted in a stepped axial bore 11 of a housing 10 with the covered electrode 4 protruding through the narrowed portion 12 of the housing bore 11 slightly over and above the front edge of the housing. A sealing means installed in the bore 12 provides positive sealing of the covered membrane 4 at this point of the housing 10. An "O-ring" 13 located in an annular groove 14 of the housing 10 seals the shaft 2 of the electrode carrier 1 off against the opposite front face of the housing.

The annular flange 3 of the electrode carrier 1 adjoins with its inner annular surface the front end 15 of the housing 10. In the outer annular surface a pressure spring 16 engages, the other extremity of which rests on the bottom surface 17 of a screwcap 18 screwed onto an external thread 19 of the housing 10, a collar 20 of the housing providing an abutment when the screwcap 18 is tightened. By the interposition of the pressure spring 16 a uniform pressure is applied by the annular flange 3 to the front surface 15 of the housing so that even securely tightening of the screwcap will in no way influence the position of the electrode carrier in the housing.

The housing 10 has a lateral filling hole 21 through which a charge of electrolytic liquid 22 can be introduced in the chamber located between the two sealing seams. Following the introduction of the electrolyte the filling hole 21 can be closed by means of an adhesive tape or the like which on account of its elasticity is capable of preventing pressure variations due to temperature fluctuations from developing in the electrolytic charge 22 which are liable to impair the sensitivity of the electrode arrangement. The electrolytic charge 22 serves to establish an electrically conductive connection between the sensitive surface 6 of the electrode 4 and the reference electrode 5.

On the side of the sensitive extremity of the electrode the housing 10 terminates in a narrowed extension 23 carrying a gasket 24 on its outer surface. This gasket 24 serves to seal the electrode arrangement off in the receiving aperture of the measuring apparatus wherein the gas analysis is performed. The same purpose is served by a design as illustrated in FIG. 2 wherein the housing 10 terminates in a tapered extension 25 on the side of the measuring point. The aperture angle of this tapered extension should obviously be the same as that of the conical receiving aperture of the measuring instrument in order to achieve positive sealing at the measuring point without having a resort to a sealing element.

Particularly effective protection for the sensitive extremity of the electrode 4 is afforded by the design illustrated in FIG. 3, wherein the aperture of the housing bore is narrowed at point 26 in such a manner that only part of the effective surface of the membrane is exposed.

FIG. 4 shows, by way of example, the installation of an electrode assembly 27 according to the invention, wherein reference number 28 designates the retracted conical receiving bore in the shell 29 of a thermostatized analyzer for the analysis of blood gases. A threaded sleeve 30 is inserted in the aperture 28 and secured in any suitable manner such as by gluing. A screwcap 32 screwed onto the threaded sleeve 30 engages an annular flange 31 of the electrode assembly 27 and presses the flange 31 against the outer annular front face of the threaded sleeve 30, as a result of which the conical extension 25 of the electrode housing comes into contact with the conical sealing surface 33 of the receiving bore 28 so as to provide effective sealing. A capillary 34 containing the blood sample to be analyzed extends directly in front of the sensitive surface of the electrode assembly 27.

FIG. 5 shows the installation of an electrode assembly 35 provided with a cylindrical housing extension 23 at the measuring point. The shell of the thermostatized container is designated by reference number 29' and the retracted receiving bore of same by number 28'. The gasket 24 tightly fitting into the lower portion of the receiving bore 28' simultaneously serves as a mount for the electrode assembly 35.

FIGS. 7 and 8 illustrate the manner in which the electrode 4 of the electrode carrier 1 shown in greater detail in FIG. 6 is covered in accordance with the present invention. For that purpose, an assembling base 36 with a trough bore 37 is used, the said through bore having a shoulder 38 serving as a support for the rubber ring 8 inserted together with a sliding taper plug 40 in the aperture 37. With a rounded-off shoulder 39 the aperture 37 changes over into the upper horizontal front face of the assembling base 36 upon which a foil 41 forming the membrane is placed so as to lie flat thereon. An annular weight 42 placed upon the foil 41 bears on the same with a uniform surface pressure.

The electrode carrier 1 with the uncovered electrode 4 is now moved downwards from the position shown in FIG. 7 and impressed into the membrane foil 41 as illustrated in FIG. 8 in such a manner that the foil extends as a uniform coating over the extremity of the electrode 4. As a result, the sliding taper plug 40 is ejected downwardly through the aperture 37 and the rubber ring is slid onto the covered electrode so as to fix the membrane 7 and keep it stretched. The electrode in its final covered condition is shown in FIG. 9.

The electrode assembly illustrated in FIG. 10 comprises an electrode 4 covered by a membrane 7 extending in the shape of a bag in the direction towards the shaft 2 of the electrode carrier 1 with its open inner end pulled over a narrowed cylindrical portion 43 of the shaft 2. The membrane 7 is secured to the shaft 2 by means of a collar 44 encompassing its inner end and made of rubber, for example, and occasionally replaced by a binding twine, in such a manner as to provide a hermetic sealing. A sleeve 45 pushed over the collar 44 serves to secure the fastening point against any tendency to work loose.

The space defined by the membrane is filled with a liquid electrolyte 22 thus establishing an electrolytic connection between the sensitive extremity 6 of the electrode 4 and the reference electrode 5.

In the electrode arrangement as shown in FIG. 11 the inner end of the membrane 7 is pulled over a tubular extension 46 of the stepped cylindrical housing 10 and secured thereto by means of a collar 47 surrounding the end of the membrane in such a manner as to provide effective sealing. The membrane 7 might be attached to the housing extension 46 also be mere gluing.

The electrode carrier 1 inserted in the housing 10 rests with a shoulder 48 on an onset 49 of the housing 10 and is connected therewith by means of a circular gluing seam 50 in such a manner as to provide a hermetic sealing. According to this embodiment of the invention the electrolytic liquid 22 fills not only the space enclosed by the membrane 7 but also the interstice between the shaft 2 of the electrode carrier 1 and the housing 10.

As a means of protecting the covered electrode 4 a narrowed cylindrical sleeve 51 is provided which is slid onto the housing 10 with the covered probe surface 6 of the electrode 4 slightly protruding over and above its lower aperture. A ring 52 of rubber or the like surrounds the membrane 7 in the area of the tapered extremity of the said sleeve 51 so that the membrane closely encompasses the electrode 4 in this sector.

The assembly of the electrode carrier shown in FIG. 11 is preferably performed in accordance with the following procedure according to the invention. The membrane 7 is first clasped so as to produce a sort of bag which is placed with its open end directly around the housing extension 46 and secured thereto by means of the collar 47 or by gluing in such a manner as to provide effective sealing. Then the electrolytic liquid 22 is poured into the bag defined by the membrane 7 whereupon the electrode carrier 1 is inserted into the housing 10 from the side opposite the membrane 7. As a result, the membrane 7 stretches around the sensitive extremity of the electrode 4. Any excess electrolytic liquid is allowed to overflow through the gap between the housing 10 and the electrode carrier 1. Finally, the electrode carrier 1 is connected with the housing by means of a circular gluing seam 50 in such a manner as to provide a hermetic sealing. After the application of the rubber ring 52 the sleeve 51 is slid onto the housing 10.

I claim:

1. A method for assembly of an electrode unit having an electrode carrier in the form of an elongated shaft with an annular flange carrying a rod-shaped electrode telescoped within a sleevelike reference electrode, the electrode having a rounded-off outer extremity forming a pressure sensitive surface, comprising the steps of: placing a sheetlike membrane on an assembling base having a centrally located trough bore with a sliding tapered plug having a depression in its upper surface facing said membrane, impressing the sensitive extremity of said electrode into said membrane and onto said depression, stretching said membrane as a uniform coating over said electrode extremity and simultaneously sliding an elastic fastening ring over said electrode, inserting said electrode carrier together with said electrode in a housing, sealing the openings between said sensitive extremity, said shaft and said housing, respectively, and filling the interior of said housing between the sealed portions thereof with an electrolytic liquid.

2. A method according to claim 1, comprising the step of loading the foil constituting the membrane in the area around the said depression of the underlayer in such a manner as to produce a uniform surface pressure.

3. A method according to claim 2, comprising the step of placing a weight onto the foil constituting the membrane.

4. A method according to claim 2, comprising the step of placing a spring-loaded clamping ring onto the foil constituting the membrane.

5. A method for assembly of an electrode unit having an electrode carrier in the form of an elongated shaft with an annular flange carrying a rod-shaped electrode telescoped within a sleevelike reference electrode, the electrode having a rounded-off outer extremity forming a pressure-sensitive surface, and surrounded by a housing having a tubular member extending therefrom towards said sensitive surface, comprising the steps of: clasping a membrane baglike fashion, placing the open end of said membrane around said tubular housing extension, securing the open end of the membrane to said housing extension to provide effective sealing therebetween, pouring an electrolytic liquid into the bag formed by the membrane, inserting said electrode carrier together with said electrode and said reference electrode in said housing from the side of the housing opposite said membrane so that said membrane stretches around said pressure sensitive outer extremity, and sealing the opening between said shaft and said housing.

6. A method according to claim 5, comprising the step of securing the shaft of the electrode carrier inserted in the housing to the said housing by gluing.

* * * * *